United States Patent [19]

Tsushio et al.

[11] Patent Number: 5,536,586
[45] Date of Patent: Jul. 16, 1996

[54] COMPOSITE HYDROGEN STORAGE ALLOY MATERIAL

[75] Inventors: Yoshinori Tsushio; Kenichi Yamamoto; Shinichi Tanioka; Tsuyoshi Morishita; Toru Ogasawara; Tsutomu Shimizu; Hironobu Fujii; Shinichi Orimo, all of Hiroshima-ken, Japan

[73] Assignee: Mazda Motor Corporation, Japan

[21] Appl. No.: 198,265

[22] Filed: Feb. 18, 1994

[30] Foreign Application Priority Data

Feb. 22, 1993 [JP] Japan .................................. 5-031717
Oct. 8, 1993 [JP] Japan .................................. 5-252778

[51] Int. Cl.$^6$ ............................... C01B 6/24; C22C 23/00
[52] U.S. Cl. ........................... 428/649; 420/900; 423/647; 423/658.2
[58] Field of Search .................... 423/658.2, 645, 423/647; 420/900; 428/553, 570, 649

[56] References Cited

U.S. PATENT DOCUMENTS

| | | | |
|---|---|---|---|
| 4,200,623 | 4/1980 | Muller et al. .................. | 423/647 |
| 4,389,326 | 6/1983 | Tanguy et al. ................ | 423/645 |
| 4,451,445 | 5/1984 | Cheng et al. .................. | 423/645 |
| 4,613,362 | 9/1986 | Welter et al. .................. | 420/900 |
| 5,199,972 | 4/1990 | Bogdamovic .................. | 423/658.2 |

FOREIGN PATENT DOCUMENTS

| | | | |
|---|---|---|---|
| 55-149101 | 11/1980 | Japan ................................ | 420/900 |
| 56-125201 | 10/1981 | Japan ................................ | 420/900 |
| 57-38301 | 3/1982 | Japan ................................ | 423/658.2 |
| 60-100664 | 6/1985 | Japan ................................ | 420/900 |
| 63-72849 | 4/1988 | Japan . | |
| 1-131001 | 5/1989 | Japan ................................ | 423/658.2 |
| 1-131002 | 5/1989 | Japan ................................ | 423/658.2 |

Primary Examiner—John Zimmerman
Attorney, Agent, or Firm—Sixbey, Friedman, Leedom & Ferguson; Gerald J. Ferguson, Jr.; Jeffrey L. Costellia

[57] ABSTRACT

A composite hydrogen storage alloy material includes a hydrogen storage alloy material and a surface material bonded to the surface of the hydrogen storage alloy material. The surface material has a potential energy between those of hydride of the hydrogen storage alloy and hydrogen gas and permits migration of hydrogen between the inside and outside of the hydrogen storage alloy material.

7 Claims, 10 Drawing Sheets

COMPOSITE HYDROGEN STORAGE ALLOY MATERIAL

BACKGROUND OF THE INVENTION

1. Field of the Invention

This invention relates to a composite hydrogen storage alloy material and a method of producing the same.

2. Description of the Prior Art

In recent years, there has been a great deal of attention focused on use of fossil fuels such as heavy oil, gasoline and the like as the main cause of air pollution and earth anathermal phenomenon, and hydrogen gas has attracted attention as an alternate clean energy source. Especially hydrogen storage alloys for storing hydrogen gas have been marked.

The hydrogen storage alloy stores and transports hydrogen by hydrogenation and dissociation of metal. It is preferred that the hydrogen storage alloy can store as much hydrogen as possible. Mg-based hydrogen storage alloys which can occlude 7.6 wt % of hydrogen have been known as hydrogen storage alloy having a large hydrogen storage capacity.

An example of the Mg-based hydrogen storage alloys is disclosed in Japanese Unexamined Patent Publication No. 63(1988)-72849. The Mg-based hydrogen storage alloy is formed by depositing a predetermined amount of ultrafine particles of Ni on Mg-Ni alloy powder, and in the Mg-based hydrogen storage alloy, a catalytic effect of Ni increases the hydrogen storing speed and the hydrogen releasing speed.

However the Mg-based hydrogen storage alloy is disadvantageous in that it must be subjected, before use, to an initial activation process in which the alloy is heated to about 400° C. in pure hydrogen and deaeration and hydrogenation are repeated in order to remove gases adsorbed on the surface of the alloy, e.g., $H_2O$, $CO$, $CO_2$ and the like, and to facilitate storing and release of hydrogen, and that it can neither store nor release hydrogen unless heated to about 300° C.

When a high temperature is necessary for the initial activation process and storage and release of hydrogen, the reservoir for accommodating the hydrogen storage alloy must have a very high high-temperature rigidity, which adds to the weight of the reservoir.

Further such hydrogen storage alloy as operates at a high temperature can be used only a limited place. For example, when such hydrogen storage alloy is used as the fuel source for a hydrogen engine vehicle, the overall weight of the vehicle becomes excessively large due to the weight of the hydrogen storage alloy and the reservoir for the alloy, which results in deterioration of fuel economy. Further in the case of a vehicle, it is difficult to provide a heat source for heating the alloy to such a high temperature, and generally it is not preferred that such a high-temperature heat source is mounted on a vehicle.

SUMMARY OF THE INVENTION

In view of the foregoing observations and description, the primary object of the present invention is to lower the temperature required for initial activation of a hydrogen storage alloy and to lower the temperature at which the hydrogen storage alloy stores and releases hydrogen.

Another object of the present invention is to improve the resistance to poison and durability of a hydrogen storage alloy.

In accordance with one aspect of the present invention, there is provided a composite hydrogen storage alloy material comprising a hydrogen storage alloy material which occludes and releases hydrogen, and a surface material which is bonded to the surface of the hydrogen storage alloy material, has a potential energy between those of hydride of the hydrogen storage alloy and hydrogen gas and permits migration of hydrogen between the inside and outside of the hydrogen storage alloy material.

Migration of hydrogen between the inside and outside of the hydrogen storage alloy depends upon the level of potential energy. FIG. 1A shows the relation between the potential energy of metal hydride formed by occlusion of hydrogen by the hydrogen storage alloy and that of hydrogen gas. In order for hydrogen inside the metal hydride to migrate to the surface of the hydrogen storage alloy (to be released from the hydrogen storage alloy), energy which is equal to or higher than the activation energy EA. In the case of magnesium hydride, the activation energy is high as compared with other metal hydrides due to oxide film on the surface of the hydrogen storage alloy. Accordingly, hydrogen gas cannot be released from the hydrogen storage alloy unless the metal hydride is heated to a substantial high temperature and high energy is supplied to hydrogen.

In the case of the composite hydrogen storage alloy material where the surface material which has a potential energy between those of hydride of the hydrogen storage alloy and hydrogen gas and permits migration of hydrogen between the inside and outside of the hydrogen storage alloy material is bonded to the surface of the hydrogen storage alloy material, the state of the potential energies therein are as shown in FIG. 1B. That is, the activation energy EA1 required to cause hydrogen to migrate from the hydrogen storage alloy material to the surface material is low, and accordingly, hydrogen can migrate from the hydrogen storage alloy material to the surface material at a relatively low temperature. Further also the activation energy required to cause hydrogen to migrate from the surface material to the outside thereof is low. Accordingly the composite hydrogen storage alloy material can release hydrogen at a low temperature.

Since the surface material has an affinity with oxygen weaker than that of the hydrogen storage alloy material, it is less apt to be combined with oxygen or other impurities. Accordingly, oxide or the like on the surface of the surface material can be diffused inside thereof and reaction between the alloy and hydrogen can be caused by an initial activation process at a relatively low temperature. This means that the composite hydrogen storage alloy material of the present invention can occlude hydrogen at a low temperature.

The composite hydrogen storage alloy material of the present invention can be produced, for instance, by mixing hydrogen storage alloy material particles and surface material particles in non-oxidizing atmosphere, heating the mixture to decompose oxide layers on the surface of the hydrogen storage alloy material particles, and then bonding together the hydrogen storage alloy material particles and the surface material particles in metallic bond (sintering). This method is advantageous in that the particles are firmly bonded since there is no oxide layer therebetween and is advantageous in lowering the activation energy. Of course, the hydrogen storage alloy material particles and the surface material particles may be bonded together by use of other metallizing technics such as vacuum deposition or other mechanical alloying technics.

Preferably the hydrogen storage alloy material comprises Mg-based hydrogen storage alloy. Since hydrides of the Mg-based alloy such as $MgH_2$, $Mg_2NiH_4$, $Mg_2CuH_4$ and the like can release hydrogen only at a high temperature (not lower than 289° C. under the atmospheric pressure) though having a large hydrogen storage capacity, it will be advantageous if such hydrides of Mg-based alloy can release and occlude hydrogen at a low temperature, which can be realized in accordance with the present invention.

Preferably the Mg-based hydrogen storage alloy material contains transition metal such as Ni, Cu and the like. The transition metal which exists in the Mg-based hydrogen storage alloy in the form of a solid solution makes unstable the state of energy inside the Mg-based hydrogen storage alloy and the potential energy of the hydride of Mg-based alloy increases as shown in FIG. 2, which lowers the activation energy EA2 required to cause hydrogen to migrate outside from the hydride and makes feasible occlusion and release at a lower temperature.

The surface material is preferably formed from low-temperature type hydrogen storage alloy which occludes and releases hydrogen at a temperature lower than that at which the hydrogen storage alloy material occludes and releases hydrogen. In order to distinguish the former hydrogen storage alloy from the latter hydrogen storage alloy, the latter hydrogen storage alloy will be sometimes referred to as "the mother hydrogen storage alloy material", hereinbelow.

Since the potential energy of the hydride of the low-temperature type hydrogen storage alloy is higher than that of the hydride of the mother hydrogen storage alloy material, such low-temperature type hydrogen storage alloy is suitable as the surface material. Though the surface material need not necessarily be hydrogen storage alloy, that the surface material is formed from such low-temperature type hydrogen storage alloy is advantageous in that a larger amount of hydrogen can be stored by the composite hydrogen storage alloy material.

As such low-temperature type hydrogen storage alloy, ZrFeCr, ZrNiCr and ZrNiMn can be employed as well as Ti-based hydrogen storage alloys and the like.

The low-temperature type hydrogen storage alloy (as the surface material) is preferably bonded to the mother hydrogen storage alloy material by diffusion bonding. When the low-temperature type hydrogen storage alloy is bonded to the mother hydrogen storage alloy material by diffusion bonding, a part of the elements forming the low-temperature type hydrogen storage alloy diffuses into the mother hydrogen storage alloy material and forms compound or solid solution with the concentration of the compound or the concentration of the solute in the solid solution gradually reducing from the surface toward the inside. Accordingly, as shown in FIG. 3, the potential energy in the mother hydrogen storage alloy gradually lowers from the surface toward the inside and at the same time, the activation energy required to cause hydrogen to migrate over each potential gap is small. This facilitates migration of hydrogen from the mother hydrogen storage alloy material to the low-temperature type hydrogen storage alloy and from the latter to the former, which makes feasible occlusion and release at a lower temperature.

Preferably at least a part of the surface material is in a nonequilibrium state. Of course, the whole surface material may be in a nonequilibrium state.

If the whole surface material is crystalline, hydrogen can enter only a limited energy level (site) and accordingly, the hydrogen atoms having various energy levels which has migrated from the inside of the mother hydrogen storage alloy material cannot be stable in energy in the surface material even if they obtain activation energy sufficient to release of hydrogen, which results in a low probability that the hydrogen atoms emigrate to the surface material.

When at least a part of the surface material is in a nonequilibrium state, the surface material has sites of hydrogen at various energy levels as shown in FIG. 4. Accordingly, the hydrogen atoms having various energy levels which has jumped over activation energy peaks required for release of hydrogen can easily emigrate to the surface material, which results in smooth occlusion and release of hydrogen.

Typically, at least a part of the surface material can be in a nonequilibrium state by employing amorphous metal as the surface material. That is, in metal the amorphous form is a typical form in which the metal is in a nonequilibrium state in the sense of thermodynamics. Different from crystals having a long-range order, the amorphous metal has only a short-range order and accordingly is not at a minimum energy level but in a metastable state. Thus the amorphous metal has various energy levels and at the same time does not shift to an equilibrium state unless an excessive energy acts thereon, e.g., unless heated above the recrystallization temperature. Accordingly when the surface material is of amorphous metal, smooth and stable occlusion and release of hydrogen can be obtained using various energy levels.

As the amorphous metal, ZrNi, ZrNiCr and the like can be suitably used, and other amorphous metals having similar properties such as Ti-Ni-based amorphous metal, Zr-Pd-based amorphous metal, Zr-Cu-based amorphous metal, Ti-Cu-based amorphous metal and the like can also be used.

In the case where the mother hydrogen storage alloy material comprises Mg-based hydrogen storage alloy (with and without transition metal), it is preferred that at least one of the mother hydrogen storage alloy material and the surface material includes an element which has an affinity with oxygen stronger than that of That is, the reason why the activation energy required for occlusion and release of hydrogen in the Mg-based hydrogen storage alloy is that the affinity of Mg with oxygen is strong and Mg is apt to form a relatively stable oxide on the surface thereof. Existence of oxide of Mg makes difficult diffusion bonding of the surface material and the Mg-based hydrogen storage alloy material. When at least one of the mother hydrogen storage alloy material and the surface material includes an element which has an affinity with oxygen stronger than that of Mg, formation of oxide of Mg is suppressed, which is advantageous in reduction of the activation energy and improving the resistance to poison of the composite hydrogen storage alloy material and results in short diffusion processing time and a stronger bond between the Mg-based hydrogen storage alloy material and the surface material.

As the element having an affinity with oxygen stronger than that of Mg, Y is suitable but other elements having the similar properties, e.g., La, Ce, misch metals can also be used.

In accordance with another aspect of the present invention, there is provided a method of producing a composite hydrogen storage alloy material in which at least a part of the surface material is in a nonequilibrium state. The method comprises the steps of mixing hydrogen storage alloy particles which occludes and releases hydrogen and nonequilibrium metal particles at least a part of which is in a nonequilibrium state and which has a potential energy between those of hydride of the hydrogen storage alloy and hydrogen gas, and bonding the hydrogen storage alloy particles and the nonequilibrium metal particles at a temperature not higher than the crystallization temperature of the nonequilibrium metal particles.

That is, nonequilibrium substance transforms to a crystalline state when heated above its crystallization temperature, and accordingly, by bonding the hydrogen storage alloy particles and the nonequilibrium metal particles at a temperature not higher than the crystallization temperature of the nonequilibrium metal particles, at least a part of the composite hydrogen storage alloy material is left nonequilibrium.

In accordance with still another aspect of the present invention, there is provided another method of producing a composite hydrogen storage alloy material in which at least a part of the surface material is in a nonequilibrium state. The method is characterized by the steps of supplying metal material for forming a surface material at least a part of which is in a nonequilibrium state and which has a potential energy between those of hydride of the hydrogen storage alloy and hydrogen gas on the surface of a hydrogen storage alloy material which occludes and releases hydrogen, irradiating the metal material with a high energy beam thereby locally fusing parts of the metal material and quenching the metal material.

That is, bonding of the nonequilibrium surface material to the hydrogen storage alloy material by press bonding of powders or members is apt to involve increase in the interfacial temperature, which is disadvantageous in preventing crystallization of the surface material since the nonequilibrium substance transforms to a crystalline state when heated above its crystallization temperature. In accordance with the method described above, the metal material for the surface material is once fused by irradiation to the high energy beam and then quenched. This quenching brings the metal material into a nonequilibrium state and bonds to the surface of the hydrogen storage alloy material, whereby the metal material for the surface material is prevented from crystallizing. Especially the fused part of the metal material for the surface material is more apt to transform to a nonequilibrium state since it is robbed of heat by the mother hydrogen storage alloy material and quenched more rapidly.

In accordance with this method, composite hydrogen storage alloy particles may be obtained by placing film of the metal material for the surface material on a plate of the hydrogen storage alloy material, fusing (by a high energy beam) and quenching the metal material to form a composite plate, and grinding the composite plate. Such composite hydrogen storage alloy particles may also be obtained by supplying metal material for the surface material on the surface of hydrogen storage alloy particles, and fusing (by a high energy beam) and quenching the metal material.

It is preferred that the hydrogen storage alloy material be placed on a cooling plate of a material having a high thermal conductivity such as Cu so that heat flows through the cooling plate and the metal material for the surface material is quenched more rapidly.

Further it is preferred that the surface of the hydrogen storage alloy material be slightly fused upon irradiation of the metal material with the high energy beam. This makes firmer the bonding between the hydrogen storage alloy material and the surface material and makes the composition at the interface of the hydrogen storage alloy material and the surface material change continuously, which results in the same effect as in the composite hydrogen storage alloy material where the surface material is bonded to the hydrogen storage alloy material by diffusion bonding.

In accordance with still another aspect of the present invention, there is provided another method of producing a composite hydrogen storage alloy material of the present invention. The method is characterized by the steps of hydrogenating Mg-based hydrogen storage alloy material to form hydride thereof and then bonding a surface material having a potential energy between those of hydride of the hydrogen storage alloy and hydrogen gas to the surface of the hydrogen storage alloy material by diffusion bonding.

As described above, oxide of Mg interferes with diffusion bonding of the Mg-based hydrogen storage alloy and the surface material and accordingly an element having an affinity with oxygen stronger than that of Mg is required. This method facilitates diffusion bonding without such an element or with less of such an element.

That is, since the hydride of the hydrogen storage alloy material formed on the surface thereof is less apt to be oxidized, no oxide layer or a thin oxide layer is formed on the surface of the hydrogen storage alloy material even if it is brought into contact with air after hydrogenation. Accordingly the element having a strong affinity with oxygen may be eliminated or reduced in amount. Otherwise the diffusion processing condition may be relaxed, thereby facilitating production of the Mg-based composite hydrogen storage alloy material and lowering the production cost.

The hydrogen storage alloy material can be hydrogenated, for instance, by bringing it into contact with hydrogen gas at 300° to 400° C. under 20 to 30 atm.

DETAILED DESCRIPTION OF THE INVENTION

Now the present invention will be described in more detail with reference to the following examples.

EXAMPLE 1

Mg-based hydrogen storage alloy powder for the mother hydrogen storage alloy material and $ZrFe_{1.4}Cr_{0.6}$ (will be abbreviated as ZrFeCr) hydrogen storage alloy powder (having Laves phases) for the surface material were mixed in a non-oxidizing atmosphere (in Ar gas), the latter being 40 wt %. Then the mixture powder was press-molded under a pressure of 5 ton/cm². Then the molded body was subjected to heat treatment at 700° C. for 0.5 hours under 2 to 3 atm and was ground, whereby Mg-based composite hydrogen storage alloy material comprising Mg-based hydrogen storage alloy powder with ZrFeCr diffused therein.

The composite hydrogen storage alloy material was subjected to activation processing under the following condition.

That is, the composite hydrogen storage alloy material was first deaerated at 170° C. for 60 minutes and then was exposed to hydrogen gas at 5° C. for 60 minutes under 1 MPa. The composite hydrogen storage alloy material was subjected to this processing cycle once or twice.

Figure 5:
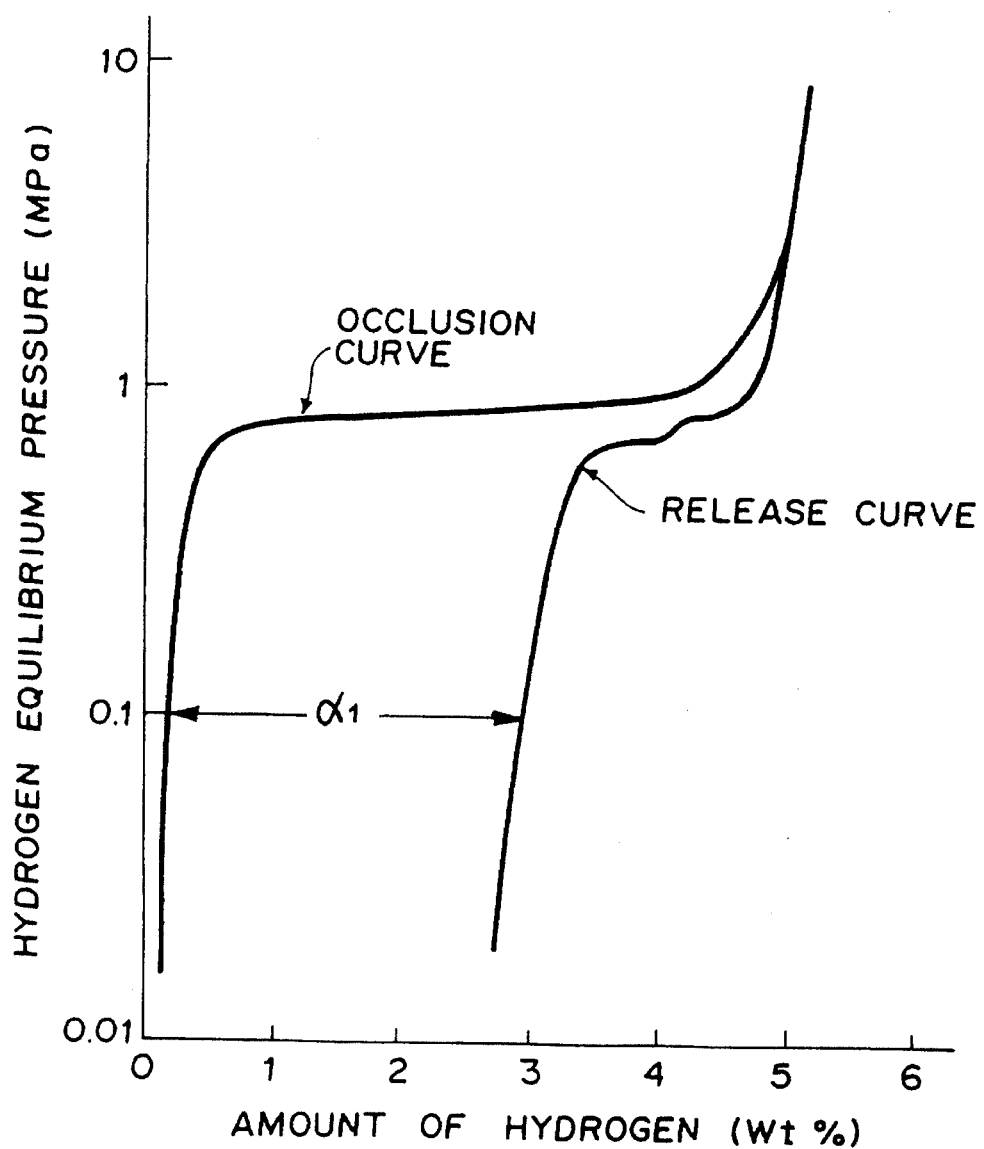
FIG. 5 is a PCT (Pressure Composition Temperature) diagram for a composite hydrogen storage alloy material having 40 wt % ZrFeCr as the surface material.

Then the hydrogen occlusion and release properties of the composite hydrogen storage alloy material thus activated were measured at 100° C. The results are shown in FIG. 5. As can be seen from FIG. 5, although at a relatively low temperature of 100° C., the composite hydrogen storage alloy material can occlude and release hydrogen at a relatively low hydrogen equilibrium pressure.

The hydrogen occlusion curve shown in FIG. 5 has a highly flat plateau region. It is conceivable that this is due to the fact that hydrogen is once occluded by ZrFeCr and then migrates to the Mg-based hydrogen storage alloy. As can be seen from comparison of the hydrogen occlusion curve with the hydrogen release curve, though hydrogen occluded by ZrFeCr is entirely released, hydrogen in the metal hydride formed by occlusion of hydrogen by the Mg-based hydrogen storage alloy still remains there in an amount corresponding to $\alpha 1$ in FIG. 5.

Measurement of the hydrogen occlusion properties of Mg-based hydrogen storage alloy powder without surface material were tried for the purpose of comparison but it could not be activated under the activating condition described above.

EXAMPLE 2

A composite hydrogen storage alloy material was produced in the same manner as in example 1 except that hydrogen storage alloy powder obtained by adding and dissolving 0.03 wt % of Ni (a transition metal) to and in Mg (will be referred to as "Mg(Ni) hydrogen storage alloy powder", hereinbelow) was employed for the mother hydrogen storage alloy material, and the composite hydrogen storage alloy material was subjected to activation processing under the same condition as in example 1.

Figure 6:
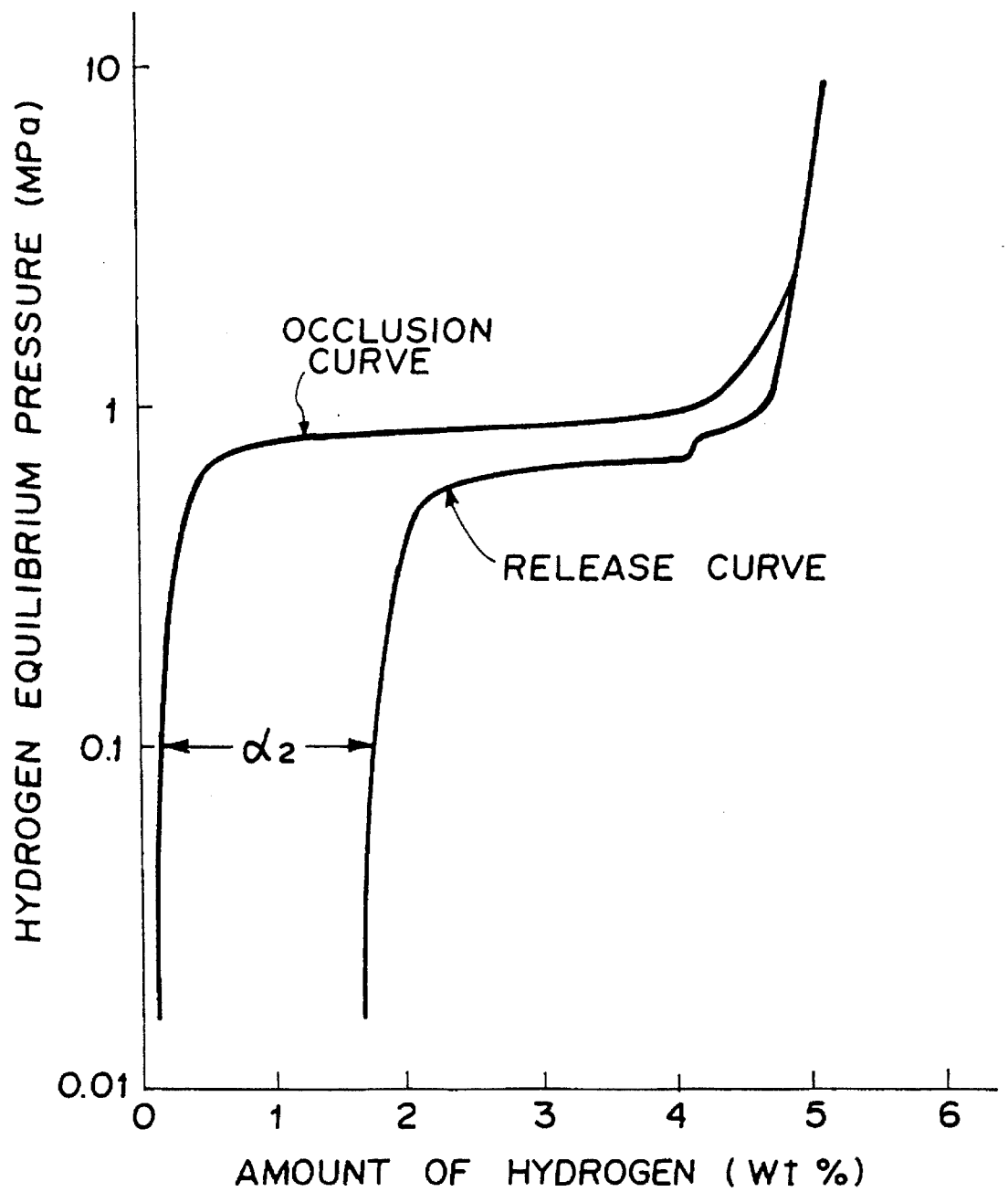
FIG. 6 is a PCT diagram for a composite hydrogen storage alloy material having Mg-based hydrogen storage alloy including Ni in the form of a solid solution.

Then the hydrogen occlusion and release properties of the activated composite hydrogen storage alloy material were measured at 100° C. The results are shown in FIG. 6. FIG. 6 shows that also the composite hydrogen storage alloy material of this example can occlude and release hydrogen at a relatively low hydrogen equilibrium pressure and a relatively low temperature.

The hydrogen occlusion curve shown in FIG. 6 has a highly flat plateau region. It is conceivable that this is due to the fact that hydrogen is once occluded by ZrFeCr and then migrates to the Mg(Ni) hydrogen storage alloy. As can be seen from comparison of the hydrogen occlusion curve with the hydrogen release curve, though hydrogen occluded by ZrFeCr is entirely released, hydrogen in the metal hydride formed by occlusion of hydrogen by the Mg(Ni) hydrogen storage alloy still remains there in an amount corresponding to $\alpha 2$ in FIG. 6. In the composite hydrogen storage alloy material having the Mg(Ni) mother hydrogen storage alloy material of this example, more of hydrogen in the metal hydride is released as compared with in the composite hydrogen storage alloy material having the Mg-based mother hydrogen storage alloy material without Ni of example 1.

Figure 1A:
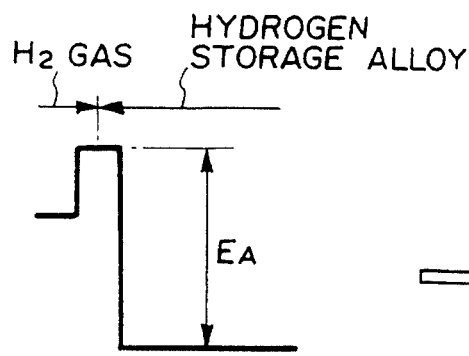
FIG. 1A is a view for illustrating the state of the potential energy before bonding the surface material to the hydrogen storage alloy material.
Figure 1B:
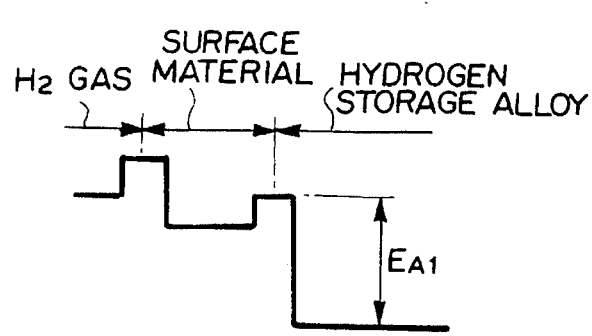
FIG. 1B is a view for illustrating the state of the potential energy after bonding the surface material to the hydrogen storage alloy material.
Figure 2:
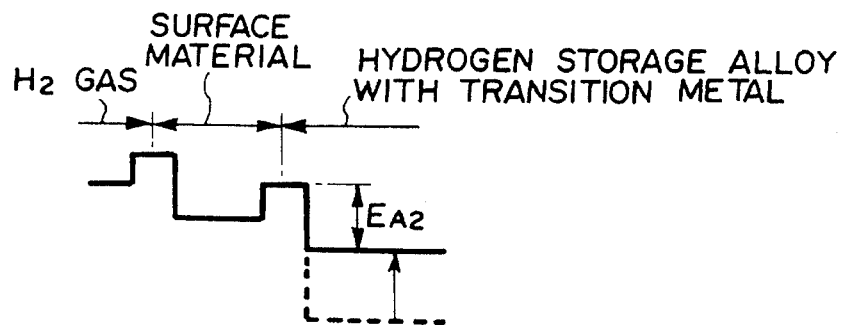
FIG. 2 is a view for illustrating the state of the potential energy in the composite hydrogen storage alloy material comprising hydrogen storage alloy material including transition metal.

Addition of Ni to Mg causes the effect described above in conjunction with FIG. 2, and the composite hydrogen storage alloy material of this example can occlude and release hydrogen with a high efficiency even at a low temperature of 100° C. However there still exists hysteresis between the hydrogen occlusion curve and the hydrogen release curve in the Mg(Ni) hydrogen storage alloy part.

Measurement of the hydrogen occlusion properties of Mg(Ni) hydrogen storage alloy powder without surface material were tried for the purpose of comparison but it could not be activated under the activating condition described above.

EXAMPLE 3

Mg-based hydrogen storage alloy powder and 40 wt % of ZrNiCr hydrogen storage alloy powder (having Laves phases) were mixed, pressed and subjected to heat treatment in the same manner as in example 1. Then the composite material obtained was subjected to diffusion processing at 500° to 600° C. for 20 hours and then ground, whereby Mg-based composite hydrogen storage alloy material was obtained.

Figure 7:
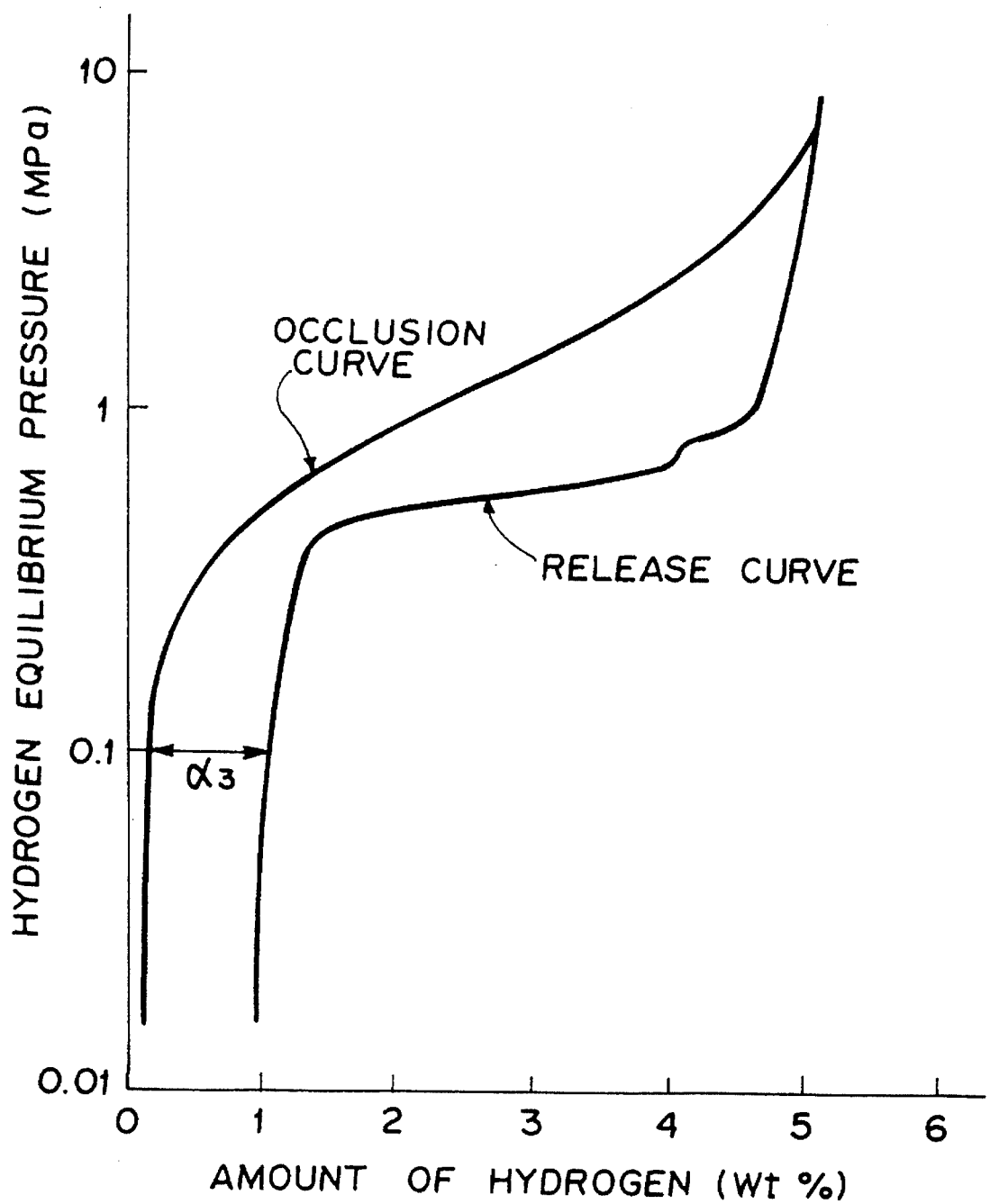
FIG. 7 is a PCT diagram for a composite hydrogen storage alloy material having, as the surface material, 40 wt % Laves phase ZrNiCr bonded to the mother hydrogen storage alloy material by diffusion bonding.

Then the Mg-based composite hydrogen storage alloy material was subjected to activation processing under the same condition as in example 1 and the hydrogen occlusion and release properties of the activated composite hydrogen storage alloy material were measured at 100° C. The results are shown in FIG. 7. In the hydrogen occlusion curve shown in FIG. 7, the plateau region is not so flat. It is conceivable that this is due to the fact that hydrogen is once occluded by ZrNiCr and then migrates to the Mg-based hydrogen storage alloy. As for the hydrogen release curve, hydrogen occluded by ZrNiCr is entirely released. In the composite hydrogen storage alloy material of this example, the hysteresis in the Mg-based hydrogen storage alloy region is small as compared with in the composite hydrogen storage alloy materials of examples 1 and 2 and less hydrogen remains there (in an amount corresponding to $\alpha 3$ in FIG. 7).

Figure 3:
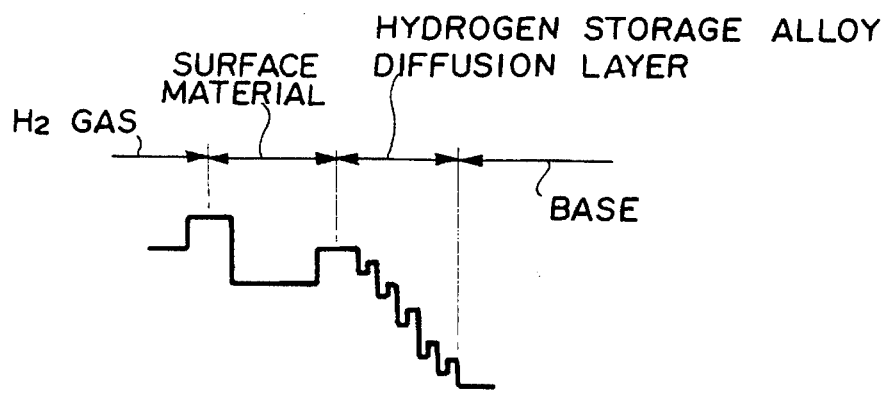
FIG. 3 is a view for illustrating the state of the potential energy in the composite hydrogen storage alloy material in which the surface material is bonded to the hydrogen storage alloy material by diffusion bonding.

This indicates that the diffusion processing causes the effect described above in conjunction with FIG. 3, and the composite hydrogen storage alloy material of this example can release hydrogen more smoothly.

EXAMPLE 4

Amorphous hydrogen storage alloy powder having a composition represented by formula ZrNiCr was prepared by gas atomization. 40 wt % of the amorphous hydrogen storage alloy powder was mixed with Mg-based hydrogen storage alloy powder and pressed in the same manner as in example 1. Then the composite material obtained was subjected to heat treatment in non-oxidizing atmosphere at 400° to 500° C. under 2 to 3 atm for twenty hours and then ground, whereby Mg-based composite hydrogen storage alloy material in which ZrNiCr are dispersed in the Mg-based hydrogen storage alloy was obtained.

Figure 4:
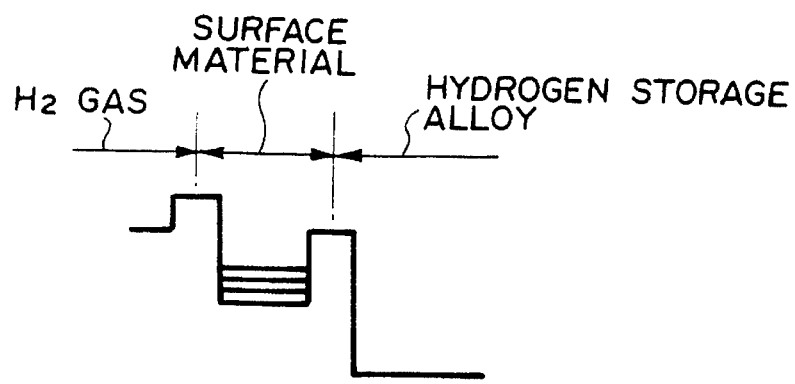
FIG. 4 is a view for illustrating the state of the potential energy in the composite hydrogen storage alloy material having a surface material formed from amorphous metal.
Figure 8:
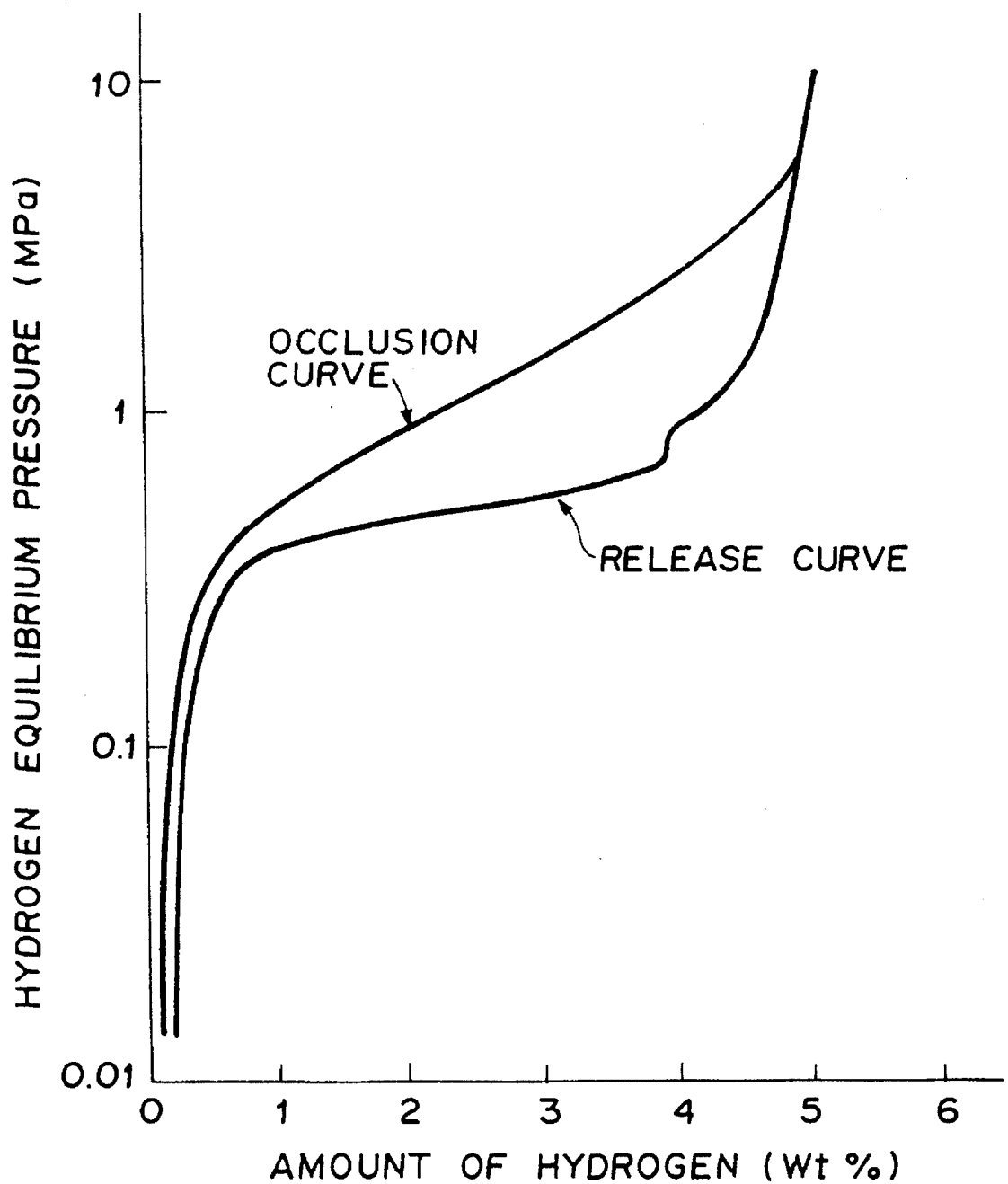
FIG. 8 is a PCT diagram for a composite hydrogen storage alloy material having amorphous ZrNiCr as the surface material.

Then the Mg-based composite hydrogen storage alloy material was subjected to activation processing under the same condition as in example 1 and the hydrogen occlusion and release properties of the activated composite hydrogen storage alloy material were measured 100° C. The results are shown in FIG. 8. In the hydrogen occlusion curve shown in FIG. 8, the plateau region is not clear. It may be considered this is because ZrNiCr in a nonequilibrium state has various energy levels. (See FIG. 4) Further the hydrogen release curve indicates that substantially all the hydrogen is released from the Mg-based hydrogen storage alloy part with almost no hydrogen remaining there. It may be considered this is because the various energy levels in the nonequilibrium ZrNiCr facilitates migration of hydrogen from the Mg-based hydrogen storage alloy part to the surface material (ZrNiCr).

EXAMPLE 5

Amorphous hydrogen storage alloy powder containing ZrNiCr as the major component and 3 wt % of Y was prepared by gas atomization. 40 wt % of the amorphous hydrogen storage alloy powder was mixed with Mg-based hydrogen storage alloy powder and pressed in the same manner as in example 1. Then the composite material obtained was subjected to heat treatment in non-oxidizing atmosphere at 400° to 500° C. under 2 to 3 atm for five hours and then ground, whereby Mg-based composite hydrogen storage alloy material in which ZrNiCr are dispersed in the Mg-based hydrogen storage alloy was obtained.

Figure 9:
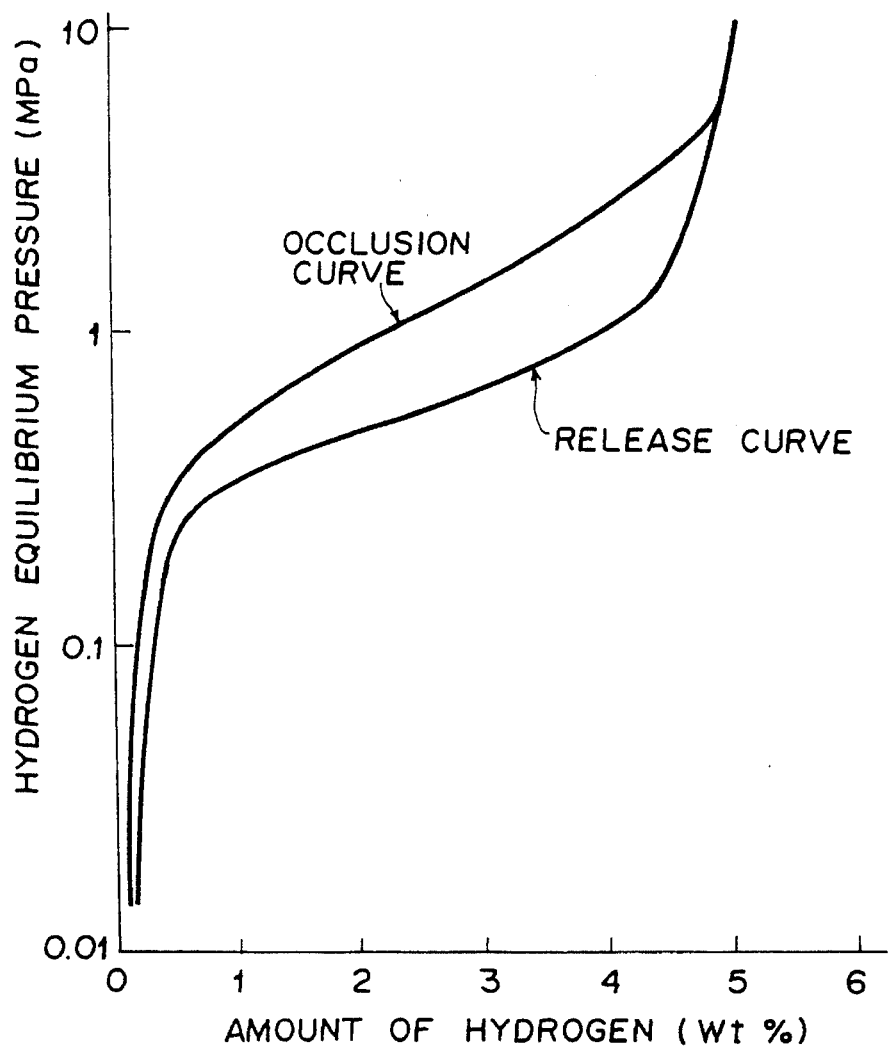
FIG. 9 is a PCT diagram for a composite hydrogen storage alloy material having, as the surface material, amorphous ZrNiCr including 3 wt % Y.

Then the Mg-based composite hydrogen storage alloy material was subjected to activation processing under the same condition as in example 1 and the hydrogen occlusion and release properties of the activated composite hydrogen storage alloy material were measured at 100° C. The results are shown in FIG. 9. In spite of a shorter heat treatment time than in example 4, the hydrogen occlusion curve and the hydrogen release curve substantially conform to each other.

It may be considered this is because addition of Y having affinity with oxygen stronger than Mg promotes decomposition of oxide on the surface of the Mg-based hydrogen storage alloy powder and lowers the activation energy required for release of hydrogen.

EXAMPLE 6

Figure 10:
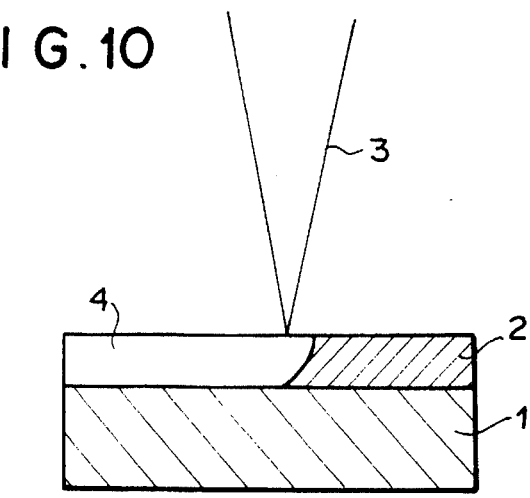
FIG. 10 is a schematic cross-sectional view showing the method of producing the composite hydrogen storage alloy material employed in example 6.

As shown in FIG. 10, a thin strip 2 of Zr—Ni alloy 50 μm in thickness and 10 mm in width which was obtained super quenching of melt was placed on a Mg-based hydrogen storage alloy plate 1 and a 500W carbon dioxide gas laser beam 3 was directed to the thin strip 2 of Zr—Ni alloy from above in an inert atmosphere (in Ar gas) while transferring the thin strip 2 at 10m/sec relative to the beam 3. The part of the thin strip 2 exposed to the beam 3 was melted and the surface of the Mg-based hydrogen storage alloy plate 1 was slightly melted at the part in contact with the part of the thin strip 2 exposed to the beam 3. As the beam 3 passed by each molten part, the molten part was quenched at a speed of $10^{5\circ}$ to $10^{6\circ}$ C./sec, whereby amorphous Zr—Ni surface layer 4 bonded to the Mg-based hydrogen storage alloy plate 1 in metallic bond was obtained. The surface layer 4 was formed in about 200 μm width by one run of the beam 3. By moving the beam 3 in the transverse direction of the strip 2 by about 100 μm each time, the whole thin strip 2 was transformed to the amorphous surface layer 4.

Then the composite material comprising the Mg-based hydrogen storage alloy plate 1 and the amorphous surface layer 4 was ground into Mg-based composite hydrogen storage alloy material particles having a particle size of not larger than a few millimeters.

Then the Mg-based composite hydrogen storage alloy material was subjected to activation processing under the same condition as in example 1 and the hydrogen occlusion and release properties of the activated composite hydrogen storage alloy material were measured at 100° C. The results are shown in FIG. 11.

Figure 11:
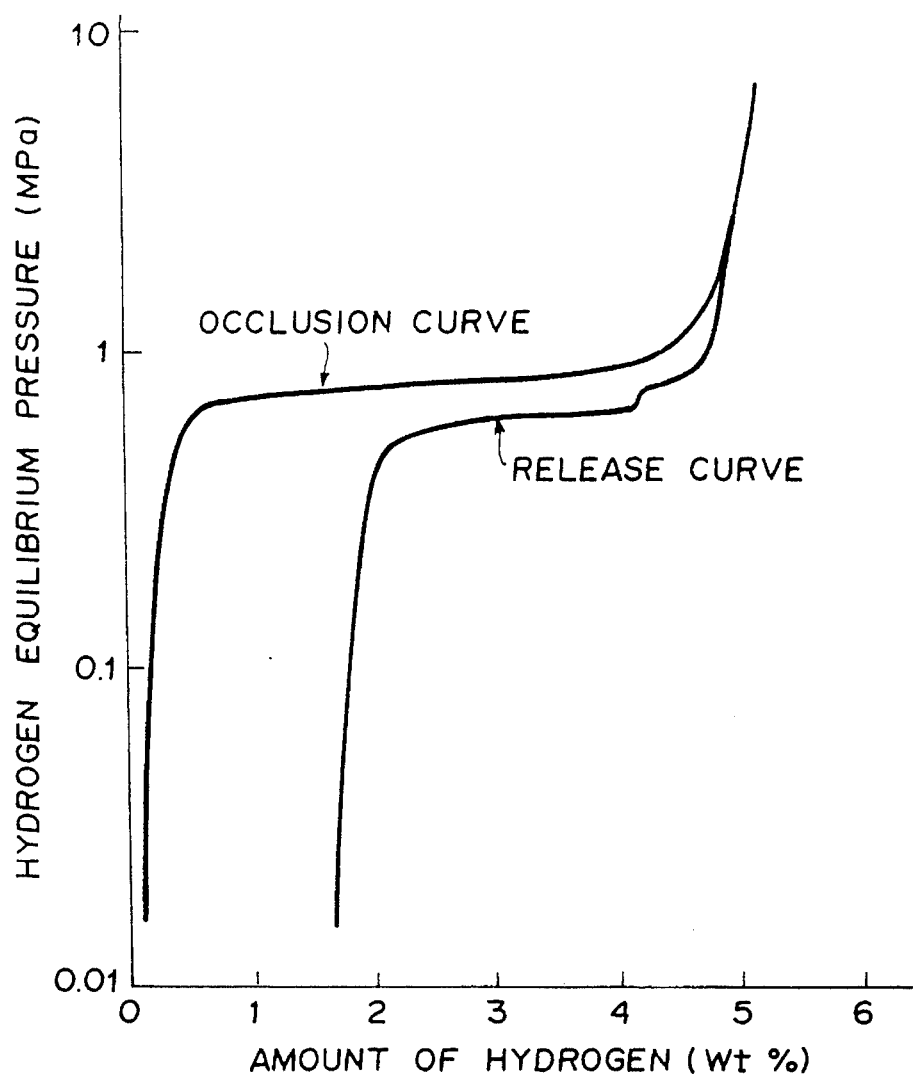
FIG. 11 is a PCT diagram for a composite hydrogen storage alloy material having amorphous Zr—Ni layer as the surface material produced in example 6.

The hydrogen occlusion curve shown in FIG. 11 has a highly flat plateau region. Further the hydrogen release curve indicates that the amount of hydrogen left in the Mg-based hydrogen storage alloy part is small. It may be considered this is due to the amorphous surface layer 4 of Zr—Ni.

EXAMPLE 7

Figure 12:
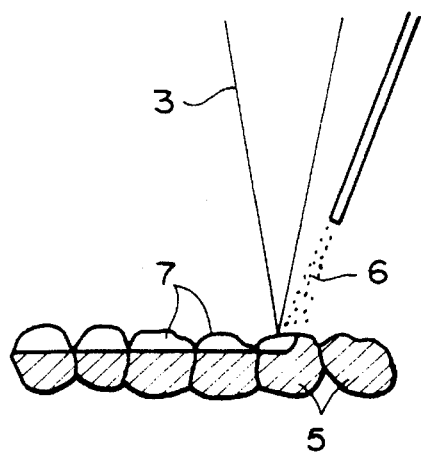
FIG. 12 is a schematic cross-sectional view showing the method of producing the composite hydrogen storage alloy material employed in example 7.

As shown in FIG. 12, coarse particles 5 of Mg-based hydrogen storage alloy having a mean particle size of 5 mm were closely spread over a cooling plate and while supplying Zr—Ni alloy powder 6 on the coarse particles 5 of Mg-based hydrogen storage alloy, a 500W carbon dioxide gas laser beam 3 was directed to the Zr—Ni alloy powder 6 following supply thereof in an inert atmosphere (in Ar gas). The Zr—Ni powder was supplied while moving the supply mechanism at 10 m/sec and the beam 3 was moved at the same speed.

The Zr—Ni alloy powder 6 was melted and the surface of the coarse particles 5 of Mg-based hydrogen storage alloy was slightly melted. As the beam 3 passed by each molten part, the molten part was quenched at a speed of $10^{5\circ}$ to $10^{6\circ}$ C./sec, whereby amorphous Zr—Ni surface layer 7 bonded to the the coarse particles 5 in metallic bond was obtained. The surface layer 7 was formed in about 200 μm width by one run of the beam 3. By supplying the Zr—Ni alloy powder 6 and directing the beam 3 while oscillating the cooling plate in a horizontal direction, the surface layer 7 was formed over the entire area of the coarse particles 5 of Mg-based hydrogen storage alloy.

Then the Mg-based composite hydrogen storage alloy material was subjected to activation processing under the same condition as in example 1 and the hydrogen occlusion and release properties of the activated composite hydrogen storage alloy material were measured at 100° C. The results were substantially the same as in example 6.

EXAMPLE 8

Figure 13:
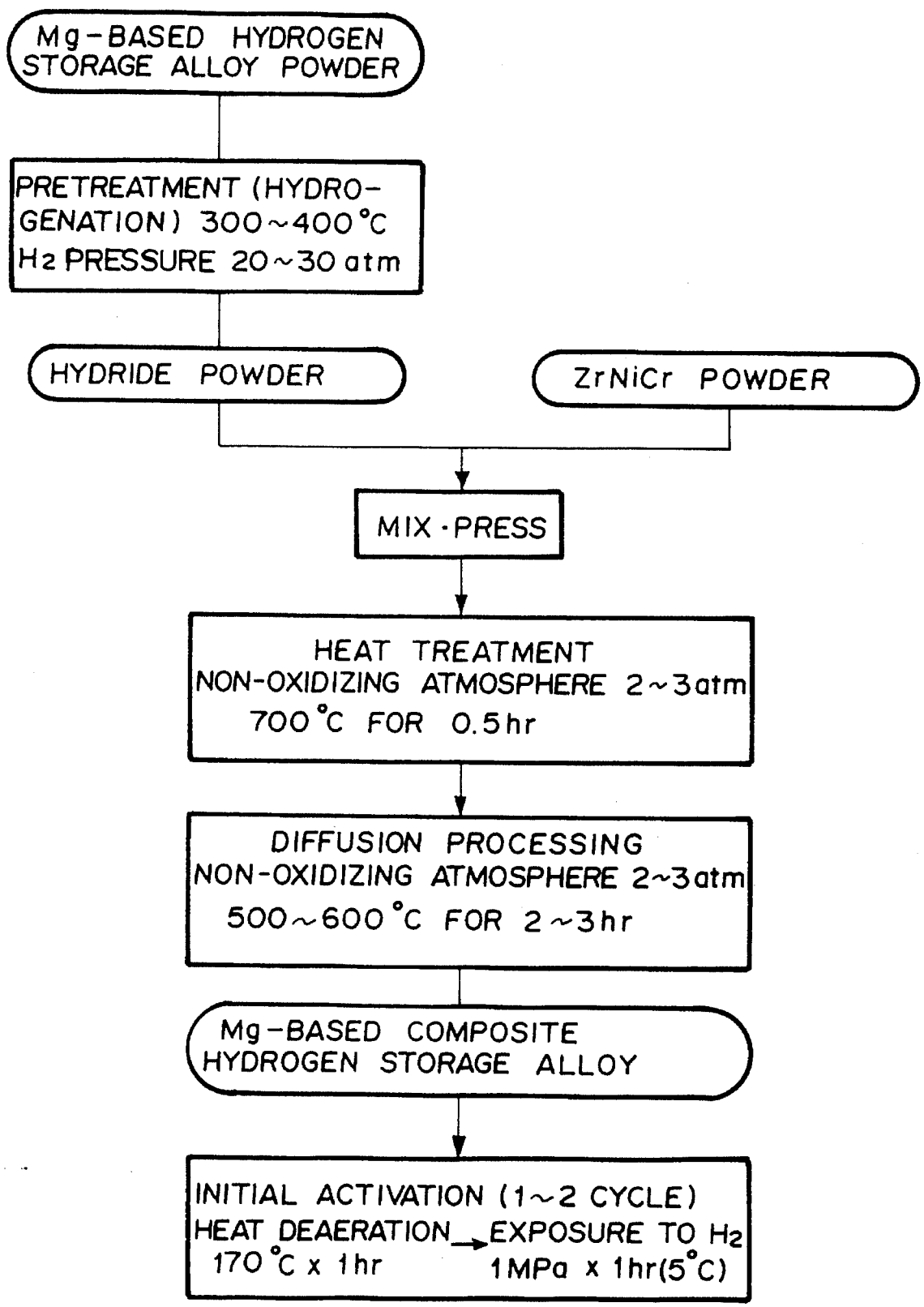
FIG. 13 is a flow sheet illustrating the method of producing the composite hydrogen storage alloy material employed in example 8.

A Mg-based composite hydrogen storage alloy material was produced according to the flow sheet shown in FIG. 13. This method is characterized in that interference of oxide of Mg with diffusion bonding of the Mg-based hydrogen storage alloy and the surface material is prevented by pretreatment of the mother hydrogen storage alloy material without use of an element having an affinity with oxygen stronger than that of Mg.

As shown in FIG. 13, Mg-based hydrogen storage alloy power was first subjected to hydrogenation (as the pretreatment) at 350° C. for 12 hours in hydrogen gas under 30 atm., thereby obtaining powder of hydride of the Mg-based hydrogen storage alloy.

Then the powder of hydride of the Mg-based hydrogen storage alloy and 40 wt % of ZrNiCr powder having Laves phases (for the surface material) were mixed in a non-oxidizing atmosphere (in Ar gas), and press-molded under a pressure of 5 ton/cm².

Then the molded body was subjected to heat treatment at 700° C. for 0.5 hours under 2 to 3 atm. in a non-oxidizing atmosphere and was ground.

Then the powder obtained was subjected to diffusion processing at 500° to 600° C. for 12 hours.

The Mg-based composite hydrogen storage alloy material was subjected to initial activation processing under the following condition.

That is, the composite hydrogen storage alloy material was first deaerated at 170° C. for 60 minutes and then was exposed to hydrogen gas at 5° C. for 60 minutes under 1 MPa. The composite hydrogen storage alloy material was subjected to this processing cycle once or twice.

Figure 14:
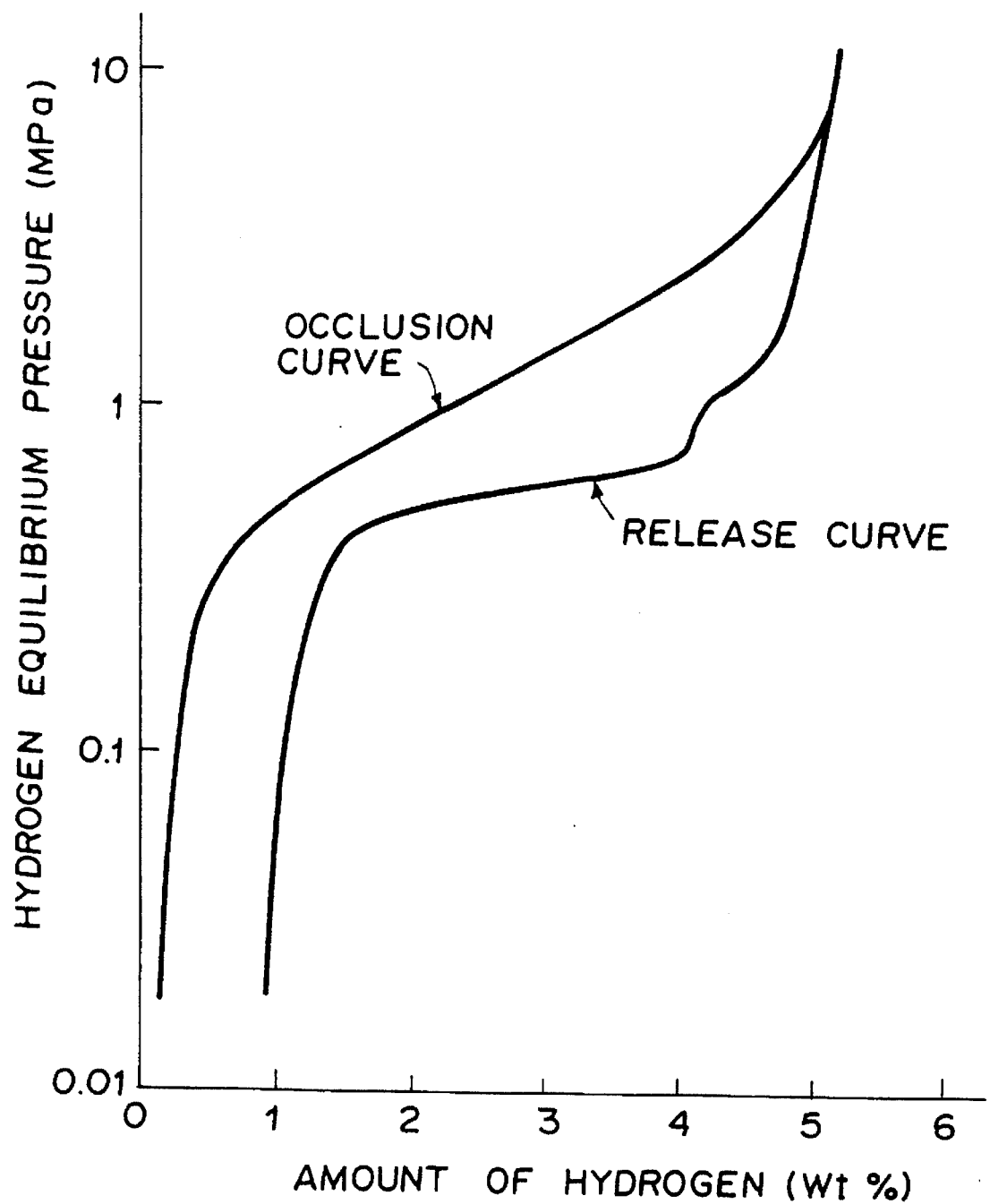
FIG. 14 is a PCT diagram for a composite hydrogen storage alloy material obtained in example 8 by hydrogenating Mg-based hydrogen storage alloy powder as the pretreatment.
Figure 15:
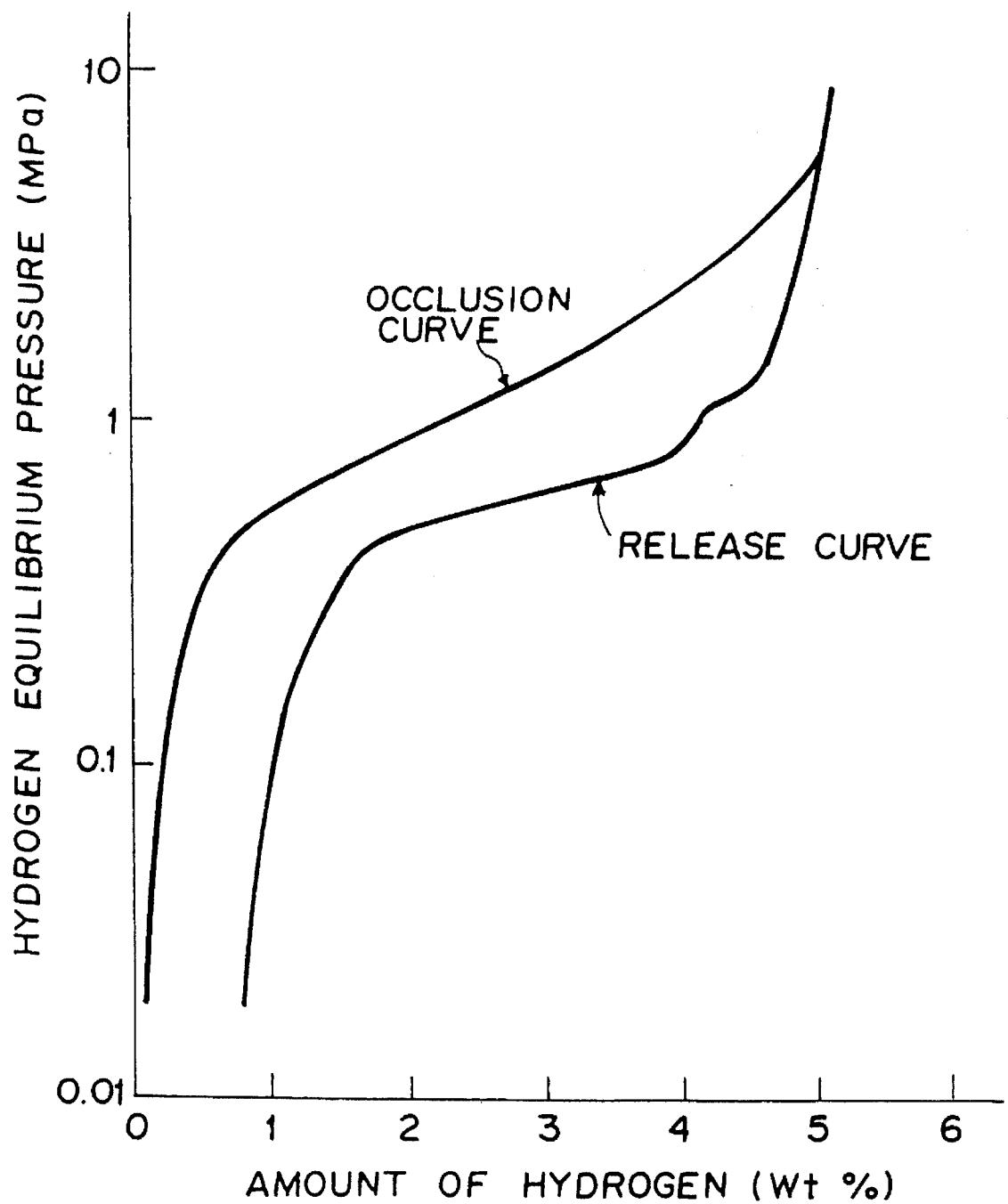
FIG. 15 is a PCT diagram for a composite hydrogen storage alloy material (as a control) obtained by adding Y to the surface material instead of the pretreatment.

Then the hydrogen occlusion and release properties of the composite hydrogen storage alloy material thus activated were measured at 100° C. The results are shown in FIG. 14. FIG. 15 shows the hydrogen occlusion and release properties of a control composite hydrogen storage alloy material which was prepared and activated in the same manner except that the Mg-based hydrogen storage alloy powder was not subjected to the pretreatment and 3 wt % of Y was added to ZrNiCr powder having Laves phases (for the surface material).

As can be understood from comparison of FIG. 14 and FIG. 15, the properties of the composite hydrogen storage alloy material of this example are substantially the same as those of the control composite hydrogen storage alloy material. This proves that formation of hydride of the Mg-based hydrogen storage alloy by the pretreatment is effective to prevent formation of oxide layer on the surface of the Mg-based hydrogen storage alloy powder, and accordingly, by such a pretreatment, necessity of an element having an affinity with oxygen stronger than that of Mg can be eliminated.

What is claimed is:

1. A composite hydrogen storage alloy material comprising a mother hydrogen storage alloy material which occludes and releases hydrogen and which has an inside and an outside, and a surface material which is bonded to the surface of the mother hydrogen storage alloy material by diffusion bonding, has a potential energy between those of a hydride of the hydrogen storage alloy and hydrogen gas and permits migration of hydrogen between the inside and outside of the mother hydrogen storage alloy material wherein said mother hydrogen storage alloy material is formed from a Mg-based hydrogen storage alloy and at least a portion of the surface material is an amorphous metal.

2. A composite hydrogen storage alloy material as defined in claim 1 in which said surface material is formed of a hydrogen storage alloy which occludes and releases hydrogen at a temperature lower than a temperature at which said mother hydrogen storage alloy material occludes and releases hydrogen.

3. A composite hydrogen storage alloy material as defined in claim 1 in which said Mg-based hydrogen storage alloy is a hydrogen storage alloy composed of a plurality of elements including a transition metal.

4. A composite hydrogen storage alloy material as defined in claim 3 in which said surface material is formed of a hydrogen storage alloy which occludes and releases hydrogen at a temperature lower than a temperature at which said mother hydrogen storage alloy material occludes and releases hydrogen.

5. A composite hydrogen storage alloy material as defined in any one of claims 1 and 2–4 in which said surface material is at least partly in a nonequilibrium state.

6. A composite hydrogen storage alloy material as defined in claim 1 in which said surface material is formed of a hydrogen storage alloy which occludes and releases hydrogen at a temperature lower than a temperature at which said mother hydrogen storage alloy material occludes and releases hydrogen.

7. A composite hydrogen storage alloy material as defined in one of claims 1 and 3 in which at least one of the mother hydrogen storage alloy material and the surface material includes an element which has an affinity with oxygen stronger than that of Mg.

* * * * *